Figure 1:
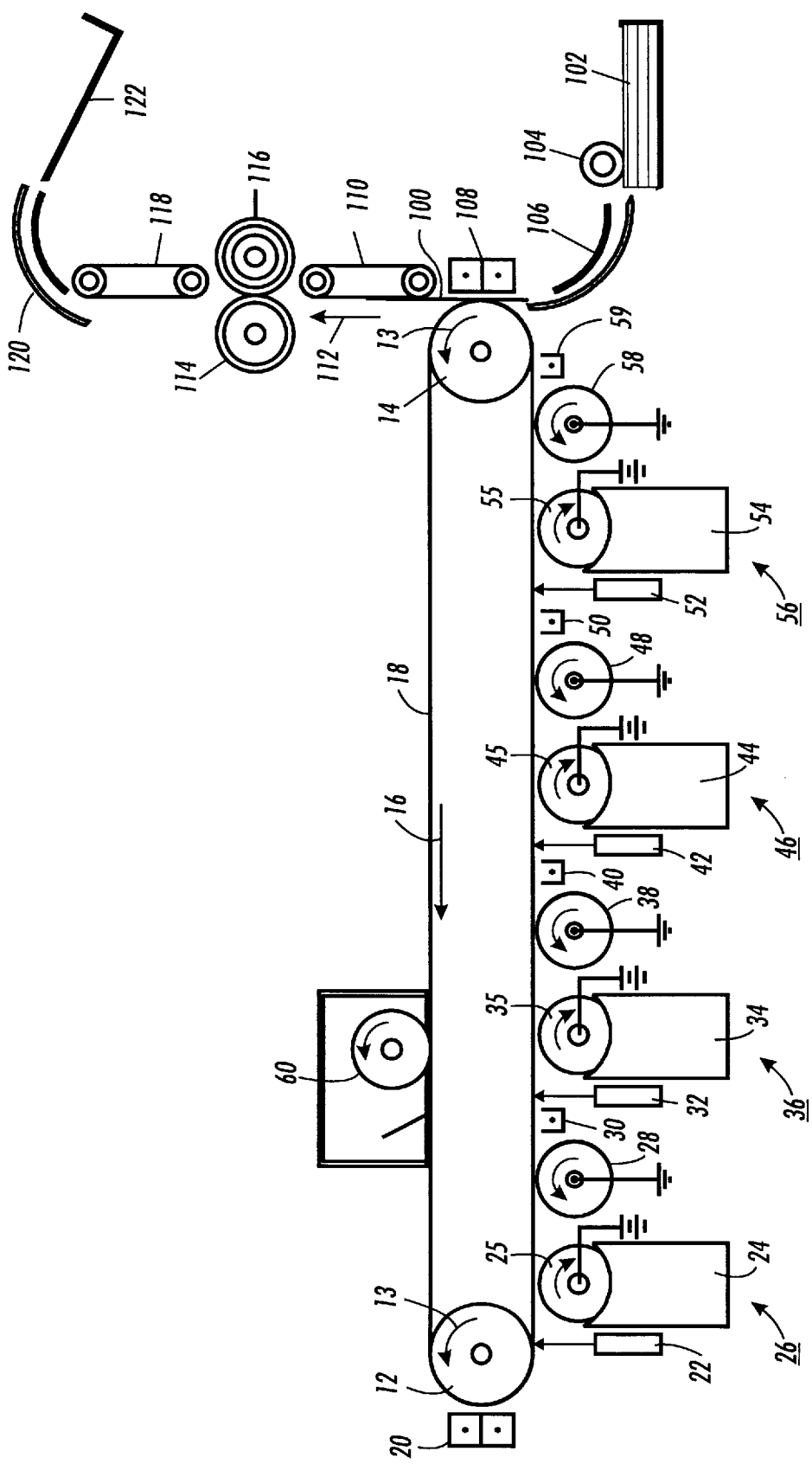

United States Patent [19]
Liu et al.

[11] Patent Number: 5,848,337
[45] Date of Patent: Dec. 8, 1998

[54] ELECTRICAL BIASING SCHEME FOR PREVENTING OVERPLATING IN AN IMAGE-ON-IMAGE ELECTROSTATOGRAPHIC PRINTING SYSTEM

[75] Inventors: Chu-heng Liu, Webster; David H. Pan, Rochester; John F. Knapp; George A. Gibson, both of Fairport, all of N.Y.; Robert M. Simms, Santa Clara, Calif.

[73] Assignee: Xerox Corporation, Stamford, Conn.

[21] Appl. No.: 829,659

[22] Filed: Mar. 31, 1997

[51] Int. Cl.$^6$ .................................................. G03G 15/01
[52] U.S. Cl. ........................... 399/231; 399/234; 399/235
[58] Field of Search .................................... 399/222, 223, 399/231, 232, 234, 235; 347/112, 115

[56] References Cited

U.S. PATENT DOCUMENTS

| | | | |
|---|---|---|---|
| 4,403,848 | 9/1983 | Snelling | 399/231 |
| 4,569,584 | 2/1986 | St. John et al. | 399/301 |
| 4,660,059 | 4/1987 | O'Brien | 347/115 |
| 5,061,969 | 10/1991 | Parker et al. | 399/232 |
| 5,069,995 | 12/1991 | Swidler | 430/115 |
| 5,515,155 | 5/1996 | Folkins | 399/231 X |
| 5,570,173 | 10/1996 | Nye et al. | 399/237 |

Primary Examiner—Arthur T. Grimley
Assistant Examiner—Hoan Tran
Attorney, Agent, or Firm—Kevin R. Kepner

[57] ABSTRACT

A method and apparatus for eliminating undesirable development of background charge potentials in a multicolor electrostatographic system is disclosed, wherein the application of a developer bias at a given development station is selectively controlled to be substantially equal to or greater than the background image voltage of the image generated by a preceding imaging station such that the voltage differential between toner particles at the development station and the background areas including the previous image areas is substantially zero and the electrostatic forces acting on the toner particles are insufficient to attract the toner particles to the residual image. A method and apparatus is disclosed for eliminating redevelopment of previous images in a multicolor electrostatographic system, and, more particularly, an image-on-image multicolor system, wherein the imaging and development biases for each color in the printing process is systematically adjusted so as to eliminate charge potential differentials which can operate to attract toner particles to the receiving member in a subsequent image development procedure.

9 Claims, 2 Drawing Sheets

ELECTRICAL BIASING SCHEME FOR PREVENTING OVERPLATING IN AN IMAGE-ON-IMAGE ELECTROSTATOGRAPHIC PRINTING SYSTEM

This invention relates generally to electrostatographic printing systems, and, more particularly, concerns an image-on-image multicolor printing system, wherein individual imaging and developer bias voltages are selectively and systematically adjusted as a function of residual, or non-uniform background charge potentials on an imaging member for preventing the development thereof in subsequent image development steps.

Generally, the process of electrostatographic copying and printing are initiated by exposing a light image of an original document to a substantially uniformly charged photoreceptive member. Exposing the charged photoreceptive member to a light image discharges the photoconductive surface thereof in areas corresponding to non-image areas in the original input document while maintaining the charge in image areas, resulting in the creation of an electrostatic latent image of the original document on the photoreceptive member. This latent image is subsequently developed into a visible image by a process in which developing material is deposited onto the surface of the photoreceptive member. Typically, this developing material comprises carrier granules having toner particles adhering triboelectrically thereto, wherein the toner particles are electrostatically attracted from the carrier granules to the latent image for forming a powder toner image on the photoreceptive member. Alternatively, liquid developing materials have been utilized, comprising marking particles, or so-called toner solids, and charge directors dispersed in a carrier liquid, wherein the liquid developing material is applied to the latent image with the marking particles in the carrier liquid being attracted toward the image areas to form a developed liquid image. Regardless of the type of developing material employed, the toner or marking particles of the developing material are attracted to the latent image and subsequently transferred from the photoreceptive member to a copy substrate, either directly or by way of an intermediate transfer member. Once on the copy substrate, the image may be permanently affixed to provide a "hard copy" reproduction of the original document or electronic image. In a final step, the photoreceptive member is cleaned to remove any charge and/or residual developing material from the photoconductive surface in preparation for subsequent imaging cycles.

The above described electrostatographic reproduction process is well known and is useful for light lens copying from an original. Analogous processes also exist in printing applications such as, for example, digital laser printing where a latent image is formed on the photoconductive surface via electronically generated or stored image data and a modulated laser beam. Some of these printing processes develop toner on the discharged area, so-called DAD, or "write black" systems, while other printing processes, such as light lens generated image systems, develop toner on the charged areas, so-called CAD, or "write white" systems.

In addition to the electrostatographic copying process described above, another well known type of electrostatic imaging process, known as ionographic printing involves the use of a dielectric sheet or an insulating web which is transported passed image generating electrodes (or the electrodes may be passed over the insulating web or sheet). The electrodes are selectively energized for depositing an electrostatic charge on the sheet or web to produce a charge pattern on the sheet or insulating web material in accordance with the potential applied to the electrodes for producing an electrostatic latent image on the sheet or web. This electrostatic image may then be developed into visual form by applying developing material to the sheet or web in any conventional manner. The resultant image is then transferred to a final copy substrate, and fused thereto, for permanently affixing the image to the copy substrate.

The present invention has equal application to systems which implement either of the described electrostatic printing processes.

Conventional electrostatographic reproduction processes as described hereinabove, which were originally directed toward the production of monochrome image copies or prints, have also been utilized to produce color copies or prints, including both highlight color (black plus one color) and full color or so-called process color images. In fact, the marketplace has generated a continuously increasing demand for color capabilities in various applications such that multicolor electrostatographic printing and copying systems have taken a very important role in the printing industry as a whole. Moreover, as the quality and capabilities of multicolor electrostatographic copying and printing technologies prove themselves in the marketplace, customers are demanding even higher image output quality at a relatively low cost. Thus, regardless of the type of electrostatic printing process utilized, it is highly desirable to provide electrostatographic printing machines having the capability of producing color output prints.

In order to produce multicolor output images, electrostatographic printing machines generally utilize a so-called subtractive color mixing, whereby multicolor images are created from three colors, namely cyan, magenta and yellow, which are complementary to the three primary colors having light progressively subtracted from white light. In the case of electrostatographic printing machines, various methods can be utilized to produce a full process color image using cyan, magenta, and yellow toner images.

One exemplary method for producing multicolor images of particular interest to the present invention is known as the Recharge, Expose, and Development (REaD) Image-On-Image (IOI)process This process involves depositing different color toner layers in superimposed registration with one another on a photoconductive surface (or other recording medium) to create a multilayered composite multicolor developed image. In this process, an initial latent image corresponding to the subtractive color of a developing material present at a first development station is recorded on the recording medium and the image is developed. Thereafter, the recording medium having the first developed image thereon may be recharged and re-exposed to record a latent image thereon corresponding to another subtractive primary color and developed once again with a second developing material of appropriate color. The process is repeated until all the different color developing material layers are deposited in superimposed registration with one another on the recording medium. The multilayered composite image may then be transferred from the surface of the recording medium to a copy sheet or other support substrate and affixed thereto to provide the multicolor print output. Variations on this of generating and developing a first latent image and subsequently generating and developing additional images over the first developed image to superimpose a plurality of developed images on one another are well known in the art, and may make advantageous use of the present invention. For example, the REaD process may be modified for ionographic processes by implementing an image generation and develop process since uniform charging or recharging of the recording medium are not required, but rather image generation via an ionographic writing head sprays ions in image configuration onto the recording medium in ionographic processes. One commercial embodiment of such a system is provided in the 8900 series machines manufactured by Xerox Corporation.

Using the typical electrostatographic printing process as an example, the REaD color process described hereinabove may be implemented via either of two architectures: a single pass, single transfer architecture, wherein multiple imaging stations, each comprising a charging unit, an imaging device, and a developing unit, are situated about a single photoconductive belt or drum; or a multipass, single transfer architecture, wherein a single imaging station comprising the charging unit, an imaging device, and multiple developer units are located about a photoconductive belt or drum. As the names imply, the single pass architecture requires a single revolution of the photoconductive belt or drum to produce a color image, while the multipass architecture requires multiple revolutions of the photoconductive belt or drum to produce the color print or copy. Various other processes and systems have been successfully implemented, wherein each color separation is imaged and developed in sequence such that each developing station (except the first developing station) must apply developing material to an electrostatic latent image over areas where a previous latent image has been developed.

One significant problem which has arisen in systems where sequential development occurs over previously developed images for producing a multicolor image is that the surface charge of one latent image may not be completely neutralized by the toner particles deposited thereon during a corresponding development cycle. In CAD ionography, if the electrostatic image of one color separation is not completely discharged by toner particles during a development cycle, that electrostatic image can attract toner of another color during a subsequent developing cycle. Similarly, in REaD processes, during the process step wherein a photoconductor is recharged to prepare the surface thereof for a subsequent imaging cycle, the recharge process step may generate a non-uniform charge potential on the photoreceptor due to the presence of previously developed images This non-uniform charge potential results in a non-uniform background potential which will be developed during a subsequent development step. Likewise, exposure and/or imaging steps may result in non-uniform discharging of the recording medium, generating non-uniform background charge potentials that may be undesirably or erroneously developed during subsequent development steps.

Thus, various circumstances may arise in image-on-image electrostatographic printing processes, wherein residual charge potentials may remain on the recording medium after a previous development step, or non-uniform background potentials may be generated which will, in turn, be developed by another color in a subsequent development step. This phenomenon is known as overplating or image staining, wherein a second process color erroneously develops non-imaging areas in regions which should not be developed during that process step. See, for additional explanation of the problem, R. M. Schaffert, Electrophotography (London: Focal Press, 1975), at pp. 184–186.

Many schemes have been advanced to overcome the problem of overplating. For example, in U.S. Pat. No. 4,701,387 to Alexandrovich et al., the problem of residual image development is discussed, wherein a proposed solution is described for rinsing the developed surface with a polar liquid after each development step. It is suggested that application of a polar rinse liquid neutralizes and solvates residual counter-ions deriving from charge control agents and stabilizers present in the liquid developer. While the Alexandrovich et al. method may be effective in reducing the staining problem, such a multiple washing procedure is time-consuming and, therefore, may be unacceptable.

The present invention contemplates an apparatus and process for eliminating overplating or staining by controlling electrical bias voltages applied in imaging and/or development steps of a typical electrostatographic printing process to substantially prevent the overplating problem. Thus, in accordance with the present invention, a scheme for selectively controlling bias voltages applied to each individual imaging development system present in the overall multi-color printing system as a function of the properties, such as the background or residual voltage associated with a residual image on the recording medium is disclosed such that the imaging and developing bias of a given color is dependent on the performance of the previous color development and/or recharge and/or imaging steps.

The following disclosures may be relevant and/or helpful in providing an understanding of some aspect of the present invention:

U.S. Pat. No. 4,403,848

Patentee: Snelling

Issued: Sep. 13, 1983

U.S. Pat. No. 4,569,584

Patentee: St. John et al.

Issued: Feb. 11, 1986

U.S. Pat. No. 5,069,995

Patentee: Swidler

Issued: Dec. 3, 1991

U.S. Pat. No. 5,570,173

Patentee: Nye et al.

Issued: Oct. 29, 1996

The relevant portions of the foregoing patents may be briefly summarized as follows:

U.S. Pat. No. 4,403,848 discloses a multicolor electrophotographic printing machine in which a color separated latent image is formed on a photoconductive belt and developed with an appropriately colored toner particles. Thereafter, successive color separated latent images are formed and developed in superimposed registration with one another. In this way, a composite multicolor latent image is formed on the photoconductive belt and subsequently transferred and fused to a sheet.

U.S. Pat. No. 4,569,584 discloses a color electrographic recording apparatus for producing a composite color image on a recording medium comprising a plurality of superimposed images of different colors, eg. magenta, cyan, yellow and black. The apparatus includes means for transporting a recording medium in opposite directions along a predetermined path through the electrographic recording apparatus, a recording station located in the path, and a recording head with electrode means for forming a latent image on the recording medium. Control means are also provided for energizing the electrode means to create a latent image on the recording medium. A plurality of developing means adjacent either one side or both sides of the recording station develops a latent image produced on the recording medium into a corresponding visible image of a respective color. The transport means is operative to pass a section of the recording medium through the recording station to form a first component latent image followed by its respective color development and reverse the direction of medium transport to permit formation of a next component latent image followed by its respective color development, and is further operative to repeat this process until all component latent images and their respective color development have been completed to produce a composite color image.

U.S. Pat. No. 5,069,995 discloses a liquid developer composition for use in electrophotographic processes, particularly consecutive color toning processes, wherein the composition contains toner particles of colorant-containing resin and an antistatic agent substantially immiscible with the resin, disbursed in a hydrocarbon medium. The antistatic agent effectively eliminates the image staining frequently obtained in consecutive color toning processes. Methods for preparing and using the novel composition are also provided.

U.S. Pat. No. 5,570,173 discloses a liquid electrostatographic printing machine comprising a photoconductive member, wherein a REaD multicolor electrostatic printing process is achieved through the use of liquid developing materials.

In accordance with one aspect of the present invention, there is provided an electrostatographic printing machine for producing a multicolor output image from an input image signal, comprising: a recording medium adapted to have a plurality of latent electrostatic images recorded thereon, defined by image charge potential areas and background charge potential areas; means for generating a first electrostatic latent image on the recording medium corresponding to a first color separation of the input image signal; means for developing the first electrostatic latent image on the recording medium with a developing material to produce a first developed image thereon; means for generating a second electrostatic latent image on the recording medium corresponding to a second color separation of the input image, the second electrostatic latent image being superimposed on the first developed image on the recording medium; means for developing the second electrostatic latent image on the recording medium with a developing material to produce a second developed image thereon; and means for applying selective bias voltages applied during the second image generating and/or developing steps as a function of background image potential areas on the recording medium to substantially prevent development of residual images.

In accordance with another aspect of the present invention, there is provided an electrostatographic printing process for producing a multicolor output image from an input image signal, comprising the steps of: providing a recording medium adapted to have a plurality of latent electrostatic images recorded thereon; generating a first electrostatic latent image on the recording medium corresponding to a first color separation of the input image; developing the first electrostatic latent image on the recording medium with a developing material to produce a first developed image thereon; generating a second electrostatic latent image on the recording medium corresponding to a second color separation of the input image, the second electrostatic latent image being superimposed on the first developed image on the recording medium; developing the second electrostatic latent image on the recording medium with a developing material to produce a second developed image thereon; and applying selective bias voltages during the second image generating and/or developing steps as a function of background image potential areas on the recording medium to substantially prevent development thereof.

Figure 2:
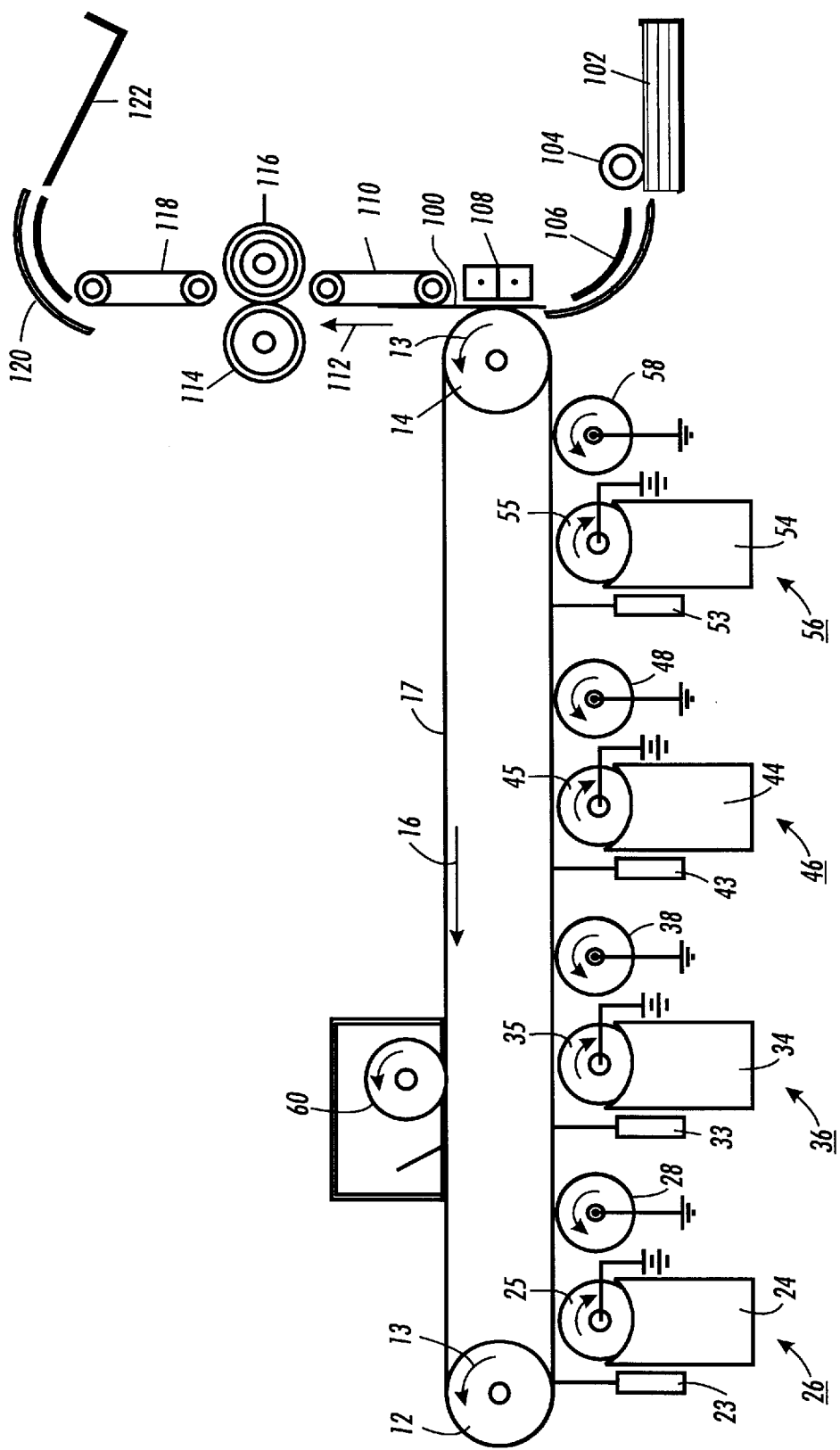

Other aspects of the present invention will become apparent as the following description proceeds and upon reference to the drawings, in which:

FIG. 1 is a schematic, elevational view of an exemplary color electrostatographic printing system, incorporating the electrical biasing scheme for eliminating overplating or image staining in accordance with the present invention; and FIG. 2 is a schematic, elevational view of an exemplary ionographic printing system incorporating electrical biasing scheme for eliminating overplating or image staining in accordance with the present invention.

For a general understanding of the features of the present invention, reference is made to the drawings, wherein like reference numerals have been used throughout to designate identical elements. FIG. 1 is a schematic elevational view illustrating an exemplary full-color electrostatographic printing machine incorporating the features of the present invention. Inasmuch as the art of electrostatographic printing is well known, the various processing stations employed in the printing machine of FIG. 1 will be described briefly prior to describing the invention in detail. It will become apparent from the following discussion that the apparatus of the present invention may be equally well suited for use in a wide variety of printing machines and is not necessarily limited in its application to the particular electrostatographic machine described herein. For example, it will be expressly understood that the method and apparatus of the present invention may find application in a dry toner-type electrostatographic printing machine, a liquid developing material-type electrostatographic printing machine as well as dry or liquid ionographic printing apparatus. Moreover, while the present invention will hereinafter be described in connection with a preferred embodiment thereof, it will be understood that the description of the invention is not intended to limit the invention to this preferred embodiment. On the contrary, the description is intended to cover all alternatives, modifications, and equivalents as may be included within the spirit and scope of the invention as defined by the appended claims.

Turning now to FIG. 1, a multicolor electrostatographic printing machine is shown, incorporating the features of the present invention therein. The printing machine employs a photoreceptive belt 18 which comprises a multilayered structure, including a photoconductive surface deposited on an electrically grounded conductive substrate, wherein the photoconductive surface is preferably made from a selenium alloy and the conductive substrate is preferably made from an aluminum alloy. The photoreceptive belt 18 is rotated along a curvilinear path defined by rollers 12 and 14 for sequentially advancing successive portions of the belt through the various processing stations disposed about the path of belt movement. As such, roller 12 is preferably rotatably driven in the direction of arrow 13 by a suitable motor and drive system (not shown) with roll 14 likewise rotating in the direction of arrow 13, thereby advancing belt 18 in the direction of arrow 16.

Initially, the belt 18 passes through a charging station, where a corona generating device 20 applies an electrical charge potential to the photoconductive surface of belt 18, placing a relatively high, substantially uniform potential thereon.

After the substantially uniform charge is placed on the photoreceptive surface of the belt 18, the electrostatographic printing process proceeds by imaging an input document (or by providing a computer generated image exposure signal) for discharging the photoconductive surface in image configuration according to the image to be generated. In this process step, the charge previously placed on the photoreceptor is selectively discharged to generate a latent electrostatic image corresponding to the desired output image. This imaging process may be accomplished by various techniques, and is most commonly accomplished by either projecting a reflected light image on to the photoreceptor to discharge non-image areas thereon, or by selectively exposing the photoreceptor to a light source in accordance with a computer generated modulation signal.

For multicolor printing and copying, the imaging process involves separating the imaging information into the three primary colors to provide a series of subtractive imaging signals, wherein each of the separate imaging signals is proportional to the intensity of the incident light of each of the primary colors. These imaging signals are then transmitted to a series of individual imaging elements 22, 32, 42 and 52, which may include a raster output scanner (ROS) or an LED array for generating complementary color separated latent images on the charged photoreceptive belt 18. Typically, each imaging element 22, 32, 42 and 52 writes the latent image information in a pixel by pixel manner.

In the exemplary electrostatographic system of FIG. 1, each of the color separated electrostatic latent images are serially developed on the photoreceptive belt 18 via a donor roll of developing apparatus 26, 36, 46 and 56. Each developing apparatus transports a different color developing material into contact with the electrostatic latent image on the photoreceptor surface so as to develop the latent image with pigmented toner particles to create a visible image. By way of example, developing apparatus 26 transports cyan colored developer material, developing apparatus 36 transports magenta colored developer material, developing apparatus 46 transports yellow colored developer material, and developing apparatus 56 transports black colored developer material. Each different color developing material comprises pigmented toner particles, wherein the toner particles are charged to a polarity opposite in polarity to the latent image on the photoconductive surface of belt 18 such that the toner particles are attracted to the electrostatic latent image to create a visible developed image thereof.

In a typical developing apparatus, a donor roll 25, 35, 45 or 55 is coated with a layer of appropriately colored developer material, and is rotated to transport the toner to the surface of belt 18, where the latent image on the surface of belt 18 image. The developer donor roll is typically electrically biased to a suitable magnitude and polarity for enhancing the attraction of the toner particles to the latent image and for preventing the transfer of toner particles on non-image areas. Each of the developer units 26, 36, 46 and 56 are substantially identical to one another and represent only one of various known apparatus that can be utilized to apply developing material to the photoconductive surface or any other type of recording medium. Moreover, it will be recognized that the present description is directed to a general description of a multicolor printing system into which the present invention may be incorporated. It will also be recognized that the development systems described herein may include additional subsystems such as, for example, an image conditioning system as described in commonly assigned U.S. Pat. No. 5,570,173, among numerous additional subsystems as described in various patents and publications available to one of skill in the art.

In an exemplary embodiment, the first color separated electrostatic latent image is developed at developing station 26 using cyan colored developer material. Thereafter, the photoreceptor belt 18 continues to advance in the direction of arrow 16 to an optional metering station 28 which may be provided for reducing the thickness of the developed image on the surface of the photoreceptor. The developed image is then advanced to a subsequent charging station whereat corona generating device 30 recharges the photoconductor having the developed image thereon to a substantially uniform charge potential. Thereafter, imaging element 32 selectively dissipates the charge laid down by corotron 30 to record a second color separated electrostatic latent image corresponding to regions to be developed with a magenta developer material. This color separated electrostatic latent image may be totally or partially superimposed on the cyan image previously developed on the photoconductive surface of belt 18. This electrostatic latent image is now advanced to the next successive developing apparatus 36 which deposits magenta toner thereon.

After the electrostatic latent image has been developed with magenta toner, the photoconductive surface of belt 18 continues to be advanced in the direction of arrow 16 to the next metering station 38 and onward to corona generating device 40, which, once again, charges the photoconductive surface to a substantially uniform potential. Thereafter, imaging element 42 selectively discharges this new charge potential on the photoconductive surface to record yet another color separated electrostatic latent image, which may be partially or totally superimposed on the prior cyan and magenta developed images, for development with yellow toner. In this manner, a yellow toner image is formed on the photoconductive surface of belt 18 in superimposed registration with the previously developed cyan and magenta images. It will be understood that the color of the toner particles at each development station may be provided in an arrangement and sequence that is different than described herein.

Next, the belt 18 continues to advance to the next metering station 48 and onward to recharge station 50 and corresponding ROS 52 for selectively discharging those portions of belt 18 which are to be developed with black toner. In one embodiment, this final black development step, the developed image is located only on those portions of the photoconductive surface adapted to have black in the printed page and is not superimposed over the prior cyan, magenta, and yellow developed images, through a process known as black undercolor removal. The belt then passes through the final metering station 58 after which the composite image is again charged to a substantially uniform potential by corona generating device 59.

The final composite multicolor developed image is next advanced to a transfer station, where a sheet of support material 100, such as paper or some similar copy substrate, is advanced from a stack 102 by a feed roll 104. The sheet advances through a chute 106 and is guided to the transfer station, where a corona generating device 108 sprays ions onto the back side of the paper 100 for attracting the composite multicolor developed image on belt 18 to the sheet of support material 100. While an electrostatic transfer process has been described, it will be recognized that various other transfer methods are known in the art, including mechanical and heat activated processes, which may be utilized to achieve transfer in the presently described apparatus. In addition, while direct transfer of the composite multicolor developed image to a sheet of paper has been described, one skilled in the art will appreciate that the developed image may be transferred to an intermediate member, such as a belt or drum, and then, subsequently, transferred and fused to the sheet of paper, as is well known in the art. After transfer, conveyor belt 110 moves the copy sheet in the direction of arrow 112 to a drying or fusing station. The fusing station includes a heated roll 114 and back-up or pressure roll 116 resiliently urged into engagement with one another to form a nip through which the sheet of paper passes. The fusing station operates to affix the toner particles to the sheet of copy substrate so as to bond the multicolor image thereto. Finally, after fusing, the finished sheet is passed onto a conveyor 118 which transports the sheet to a chute 120 and guides the sheet into a catch tray 122 for removal therefrom by the machine operator.

Generally, after the developed image is transferred from belt 18, residual developer material tends to remain, undesirably, on the surface thereof. In order to remove this residual toner from the surface of the belt 18, a cleaning roller 60, typically formed of an appropriate synthetic resin, is driven in a direction opposite to the direction of movement of belt 18 for contacting and cleaning the surface thereof. It will be understood that a number of photoconductor cleaning means exist in the art, any of which would be suitable for use with the present invention.

It will be recognized that the foregoing description is directed toward a Recharge, Expose, and Develop (REaD) process for systematically recharging and re-exposing a photoconductive member to record latent images thereon, whereby, a charged photoconductive surface is serially exposed to record a series of latent images thereon corresponding to the subtractive color of one of the colors of the appropriately colored toner particles at a corresponding development station, with the different color toner layers being deposited in superimposed registration with one another on the photoconductive surface of belt 18. It should be noted that either discharged area development (DAD) techniques, wherein discharged portions are developed, or charged area development (CAD) techniques, wherein charged areas are developed, can be employed, as are well known in the art.

It will also be noted that analogous processes exist for electrostatographically producing multi-color output prints. Of particular interest with respect to the present invention is the well-known ionographic-type printing process, wherein latent images are recorded on a dielectric recording medium. An exemplary printing system of this type adapted to produce multicolor output prints is shown schematically on FIG. 2. It will be noted that the system of FIG. 2 is very similar to the system of FIG. 1, with two important exceptions. First, the recording medium which is embodied as a photoconductive belt 18 in FIG. 1 is replaced by an electrically insulating or resistive dielectric material, generally identified in FIG. 2 as belt 17, wherein the dielectric material is capable of retaining an electrical charge applied thereto. In contrast to the photoreceptive recording medium of FIG. 1, ionographic recording media typically possess negligible, if any, photosensitivity which, in turn, provides considerable advantages, such as: elimination of a requirement for the electrophotographic recording medium to be maintained in a light impermeable environment; and characteristically low level of charge decay over time resulting in a substantially constant voltage profile on the recording medium over an extended time period.

A second distinction of ionographic type electrostatographic printing systems is found in the imaging system, whereby the latent image is generated on the recording medium 17. Once again, in contrast to the photoreceptive charging and subsequent selective discharge of the photoconductive recording medium described with respect to the system of FIG. 1, in ionographic systems, latent images are formed by directly depositing charge in image configuration onto the dielectric recording medium. In one simple form of ionographic image generation, a linear array of ion emitting devices or ion heads, are used to apply a surface charge density on the dielectric recording medium surface for creating a latent electrostatic image thereon. Various alternative imaging devices are known in the art, such as a writing head having one or more aligned rows of writing stylus electrodes supported in a dielectric support member opposite, and in alignment with, an aligned row of backup electrodes, as disclosed, for example, in U.S. Pat. Nos. 4,042,939 and 4,315,270. It will be apparent to those skilled in the art that other electrode arrangements for recording a latent image on a dielectric recording medium may be incorporated in the ionographic type electrostatographic printing system of FIG. 2.

Thus, as in the REaD (Recharge, Expose and Develop) process described with respect to FIG. 1, the ionographic type electrostatographic printing system of FIG. 2, involves a step in which an electrostatic latent image is formed on a record medium at an imaging station having a recording head 23, 33, 43 or 53. One version of the recording head comprises a plurality of recording or writing electrodes physically positioned to electrically address the dielectric surface of the recording medium as the medium travels past the image recording head. An aligned series of backup electrodes is also provided opposite to these writing electrodes forming a printing gap therebetween, whereby an electrostatic charge is deposited on the dielectric portion of the recording medium when the potential difference between addressed writing electrodes and the oppositely opposed backup electrodes is raised to a threshold level, also referred to as a Passion breakdown point, which may be on the order of several hundred volts. The timing sequence of energization of the electrodes provides for selective electrical charging of the dielectric recording medium in image configuration to form the desired latent image as the recording medium is moved past the imaging head.

Once the latent image is formed on the dielectric recording medium 17, the steps of developing the electrostatic latent image to form a visible image thereof may be identical to, or at least similar to, the development process described with respect to FIG. 1. Likewise, image transfer and fusing may be carried out using processes as previously described herein. It will be apparent to those of skill in the art that any of various systems and processes for carrying out each of the steps of the ionographic type electrostatographic printing system described herein are known in the art and may be utilized.

As previously noted, a significant problem which exists in systems wherein sequential development steps are conducted over previously developed images in order to produce a multicolor image arises when developable charge potentials are created due to incomplete image charge dissipation and/or, generation of non-uniform background potentials due to the presence of a developed image which tends to elevate the background potential. These potentials are capable of attracting toner particles during subsequent development steps, leading to a phenomenon typically known as "overplating" or "staining". It will be understood that this problem is caused by non-uniform background voltage potentials on the recording medium after a development and/or recharge and/or imaging cycle, which, in turn, may be developed by another color in a subsequent development step.

The present invention contemplates a process and apparatus for preventing image overplating or staining by systematically selecting development voltage biases for each subsequent development cycle in a manner which tends to eliminate the circumstances that lead to overplating. Thus, in accordance with the present invention, a scheme is disclosed for providing bias voltages to each individual development system present in the overall multi-color printing system such that the developing bias of a given color is dependent on the performance of the previous color development and/or recharge and/or imaging steps.

In its simplest form, the concept of the present invention is directed toward applying a predetermined bias to each developer housing for controlling development in the background areas on the recording medium. Thus, the bias of the development roll is set to a voltage that is substantially equal to or greater than the charge potential in the background area. This biasing technique substantially prevents the development of the background areas, which may include some previous image areas, by the current development station.

The change of development due to the change of development bias can be compensated in a number of ways. For example, an alternative, and more sophisticated embodiment of the concept of the present invention includes additional similar systematic variation of image recharge bias voltage for each latent image generating process step in the multi-color imaging process. In particular, the latent image voltage potential for any given color image generated on the recording member is selected to be dependent on the development bias of the previous color. In a preferred embodiment, both image bias voltage and development bias voltages are controlled in accordance with the development parameters of the previous color in the multi color process to virtually eliminate the problem of residual image overplating, thereby maintaining the proper development of image areas.

The concept of the present invention will now be described in terms of exemplary bias voltages applied to each imaging and development station. It will be understood that in a basic development subsystem, the toner particles in the developing material obey the basic rule that the force on the toner particles is equal to the product of the charge and the electrical field such that toner particles are attracted to the recording medium only when the electrostatic forces acting on the particles is greater than zero. In a typical electrostatographic printing system, a voltage bias is applied to a developer system (as represented schematically in FIGS. 1 and 2) so that a greater potential is required on the recording medium in order to attract the toner from the developer housing. This practice is utilized to significantly decrease the amount of toner that develops to non-image or background areas of the recording medium. Thus, a bias voltage is generally applied to a development system in order to control background development.

In accordance with the foregoing explanation, it will be recognized that in a multicolor electrostatographic system of the type shown and described herein, the bias voltage applied to the first development housing, identified generally by reference numeral 24 is provided strictly for controlling background and image development.

However, in accordance with the present invention, the bias applied to the subsequent development subsystem, in this case, developer housing 34, is selectively controlled in order to prevent the staining or overplating phenomenon. Since the development bias of the subsequent developer housing is increased to prevent overplating, the imaging voltage of the associated image must also be increased by substantially the same amount in order to sustain the development process of that respective color image. As an example, in the absence of any background potential on the receiving member, a typical imaging voltage at the second imaging station 32 or 33 may be in the vicinity of 100 volts while a biasing voltage of 5 volts may be applied to the associated developer housing 34 for development of the second color. However, if the first image development recharge and imaging cycle leaves a background potential on the recording medium of 20 volts, the bias voltage applied to the subsequent developer housing is raised to approximately 25 volts in order to prevent development of that residual image in accordance with the scheme of the present invention. In turn, the imaging or recharge voltage used for creating the second image must also be increased in order to maintain the same voltage differential between that image and the associated developer housing. In this case, the second imaging station is provided with an electrical bias for creating an image potential of 120 volts. The same scheme for increasing voltages would be applied to the subsequent imaging and development subsystems in a manner as described such that the image voltage at the first imaging station 22 or 23 is less than the imaging voltage at the second imaging station 32 or 33, which is less than the imaging voltage at the third imaging station 42 or 43, which, in turn, is less than the voltage applied to the fourth imaging station 52 or 53. Likewise, the bias voltage applied to the developer housing 24, is less than the developer bias applied to the developer housing 34, which is less than the developer bias applied to the developer housing 44 which, in turn, is less than the developer bias applied to developer housing 54. Most importantly, the developer bias at a given development station is selectively controlled to be substantially equal to or slightly greater than the background generated by the development recharge and imaging cycle. This step-up nature of the imaging and development bias voltages is a unique feature of the present invention.

In review, a method and apparatus for eliminating development in background areas in a multicolor electrostatographic system has been described. The process of the present invention includes the application of a developer bias at a given development station which is selectively controlled to be substantially equal to or slightly greater than the background voltage of the image generated by the preceding development recharge imaging cycle such that the voltage differential between toner particles and the image at the development station is substantially zero and the electrostatic forces acting on the toner particles is insufficient for attracting the toner particles to the background.

It is, therefore, apparent that there has been provided, in accordance with the present invention, a method and apparatus for eliminating background development in a multi-color electrostatographic system, and, more particularly, an image-on-image multicolor system, wherein the development biases for each color in the printing process is systematically increased so as to eliminate voltage potential differentials which can operate to attract toner particles to the receiving member in background areas of a subsequent image development process. This apparatus fully satisfies the aspects of the invention hereinbefore set forth. While this invention has been described in conjunction with specific embodiments thereof, it is evident that many alternatives, modifications and variations will be apparent to those skilled in the art. Accordingly, it is intended to embrace all such alternatives, modifications, and variations as fall within the spirit and broad scope of the appended claims.

We claim:

1. An electrostatographic printing machine for producing a multicolor output image from an input image signal, comprising:

a recording medium adapted to have a plurality of latent electrostatic images recorded thereon, defined by image charge potential areas and background charge potential areas;

a first imaging device for generating a first electrostatic latent image on said recording medium corresponding to a first color separation of the input image signal;

a first development apparatus for developing the first electrostatic latent image on said recording medium with a developing material to produce a first developed image thereon;

a second imaging device for generating a second electrostatic latent image on said recording medium corresponding to a second color separation of the input image, said second electrostatic latent image being superimposed on said first developed image on said recording medium;

a second development apparatus for developing the second electrostatic latent image on said recording medium with a developing material to produce a second developed image thereon; and means for applying a selected bias potential to said second development apparatus in accordance with the background charge potential areas on said recording medium to substantially prevent development thereof.

2. The electrostatographic printing machine of claim 1, wherein:

an elevated background charge potential associated with development of said first electrostatic latent image may be undesirably retained on said recording medium after development thereof; and said means for applying the selected bias potential to said second development apparatus provides a bias thereto in accordance with the elevated background charge potential areas on said recording medium to substantially prevent development thereof.

3. The electrostatographic printing machine of claim 1, wherein:

a residual charge potential associated with said first electrostatic latent image may be undesirably retained on said recording medium after development thereof; and said means for applying the selected bias potential to said second development apparatus provides a bias thereto in accordance with the residual charge potential areas on said recording medium to substantially prevent development thereof.

4. The electrostatographic printing machine of claim 1, further including means for applying a selected bias potential to said second imaging device in accordance with the means for applying a selected bias potential to said second development apparatus for generating a second electrostatic latent image on said recording medium having a charge potential capable of being developed by the selected bias potential applied to said second development apparatus.

5. The electrostatographic printing machine of claim 1, wherein said recording medium includes a photoconductive imaging member.

6. The electrostatographic printing machine of claim 5, wherein said imaging devices include:

a charging member for applying a substantially uniform electric charge to said photoconductive imaging member; and a light emitting device for selectively dissipating said uniform electric charge on said photoconductive imaging member in image configuration for producing said latent electrostatic image on said photoconductive imaging member.

7. The electrostatographic printing machine of claim 1, wherein said recording medium includes a dielectric member of the type generally utilized in an ionographic printing machine.

8. The electrostatographic printing machine of claim 6, wherein said imaging devices include:

a charging member for selectively applying electrostatic charge potentials to said dielectric member in image configuration for producing said latent electrostatic image thereon.

9. An electrostatographic printing process for producing a multicolor output image from an input image signal, comprising the steps of:

providing a recording medium adapted to have a plurality of latent electrostatic images recorded thereon, defined by image charge potential areas and background charge potential areas;

generating a first electrostatic latent image on said recording medium corresponding to a first color separation of the input image;

developing the first electrostatic latent image on said recording medium with a developing material to produce a first developed image thereon;

generating a second electrostatic latent image on said recording medium corresponding to a second color separation of the input image, said second electrostatic latent image being superimposed on said first developed image on said recording medium;

developing the second electrostatic latent image on said recording medium with a developing material to produce a second developed image thereon; and applying selective bias voltages during said image generating and developing steps as a function of the background charge potential on said recording medium to substantially prevent development thereof.

* * * * *